(12) United States Patent
Sprague

(10) Patent No.: US 10,233,097 B2
(45) Date of Patent: Mar. 19, 2019

(54) LIQUID TREATMENT APPARATUS WITH RING VORTEX PROCESSOR AND METHOD OF USING SAME

(71) Applicant: Fluid-Quip, Inc., Springfield, OH (US)

(72) Inventor: Allison Sprague, Prescott (CA)

(73) Assignee: Fluid-Quip, Inc., Springfield, OH (US)

( * ) Notice: Subject to any disclaimer, the term of this patent is extended or adjusted under 35 U.S.C. 154(b) by 351 days.

(21) Appl. No.: 14/960,874

(22) Filed: Dec. 7, 2015

(65) Prior Publication Data

US 2016/0158717 A1 Jun. 9, 2016

Related U.S. Application Data

(60) Provisional application No. 62/089,033, filed on Dec. 8, 2014.

(51) Int. Cl.
| | |
|---|---|
| *B01F 11/02* | (2006.01) |
| *C02F 1/34* | (2006.01) |
| *B01J 19/00* | (2006.01) |
| *B01J 19/24* | (2006.01) |

(52) U.S. Cl.
CPC ............ *C02F 1/34* (2013.01); *B01F 11/0283* (2013.01); *B01J 19/008* (2013.01); *B01J 19/2405* (2013.01); *C02F 2201/002* (2013.01); *C02F 2301/026* (2013.01); *C02F 2305/023* (2013.01)

(58) Field of Classification Search
CPC .................................................. B01F 11/0283
USPC ............................................. 366/124, 176.1
See application file for complete search history.

(56) References Cited

U.S. PATENT DOCUMENTS

| | | | | |
|---|---|---|---|---|
| 4,474,251 A | * | 10/1984 | Johnson, Jr. ............ | B05B 17/06 175/67 |
| 4,644,974 A | | 2/1987 | Zingg | |
| 5,326,468 A | | 7/1994 | Cox | |
| 5,519,670 A | | 5/1996 | Walter | |
| 5,897,062 A | * | 4/1999 | Enomoto .................. | B05B 1/02 175/67 |
| 5,937,906 A | * | 8/1999 | Kozyuk ................ | B01F 5/0661 138/37 |
| 6,042,089 A | | 3/2000 | Klein | |
| 9,932,246 B2 | | 4/2018 | Sprague | |
| 2008/0099410 A1 | | 5/2008 | Sprague | |
| 2010/0012049 A1 | | 1/2010 | Pless | |

OTHER PUBLICATIONS

The United States Patent and Trademark Office, International Search Report and Written Opinion in corresponding International Patent Application No. PCT/US2014/25276, dated Jul. 3, 2014 (11 pages).

(Continued)

*Primary Examiner* — David L Sorkin
(74) *Attorney, Agent, or Firm* — Wood Herron & Evans LLP

(57) ABSTRACT

The present invention provides a liquid treatment apparatus with ring vortex processor for treating a liquid medium and, more particularly, to an apparatus and method for enhancing chemical reactions occurring in processes utilizing hydrodynamic cavitation. The liquid treatment apparatus with ring vortex processor efficiently utilizes fluid energy for cavitation bubble formation, maximizes the temperatures and pressures generated during bubble collapse, and minimizes damage caused by erosion.

24 Claims, 2 Drawing Sheets

(56) References Cited

OTHER PUBLICATIONS

Lesko, Timothy M., "Chemical Effects of Acoustic Cavitation," Doctorate Thesis for California Institute of Technology, Pasadena, CA, (Apr. 2004) (198 pages).
Chahine, G.L., "Pressures Generated by a Bubble Cloud Collapse," Chemical Engineering Communications, vol. 28, pp. 355-367, (1984) (13 pages).
Suslick, Kenneth S., et al., "Chemistry Induced by Hydrodynamic Cavitation," Journal of the American Chemical Society, vol. 119, pp. 9303-9304, (1997) (2 pages).
Kalumuck, K. M., et al., "Remediation and Disinfection of Water Using Jet Generated Cavitation," Fifth International Symposium on Cavitation (CAV2003), Osaka, Japan, (Nov. 1-4, 2003) (8 pages).
Sharma, Amit M., et al., "Modeling of Hydrodynamic Cavitation Reactors Based on Orifice Plates Considering Hydrodynamics and Chemical Reactions Occurring in Bubble," Chemical Engineering Journal 143, pp. 201-209, (2008) (9 pages).
Suslick, Kenneth S., "The Chemical Effects of Ultrasound," Scientific American, pp. 80-86, (Feb. 1989) (7 pages).
Suslick, Kenneth S., et al., "Acoustatic Cavitation and Its Chemical Consequences," Philosophical Transactions of the Royal Society London A, Great Britain, vol. 357, pp. 335-353 (1999) (20 pages).
Konno, A., et al., "On the Collapsing Behavior of Cavitation Bubble Clusters," Fourth International Symposium on Cavitation (CAV2001), Session A8.003, California Institute of Technology, Pasadena, CA (Jun. 20-23, 2001) (8 pages).
Neis, U., et al., "Ultrasonic Disinfection of Wastewater Effluents for High-Quality Reuse," IWA Regional Symposium on Water Recycling in Mediterranean Region, Iraklio, Greece, (Sep. 26-29, 2002) (8 pages).
Peters, M.C.A.M., et al., "Damping and Reflection Coefficient Measurements for an Open Pipe at Low Mach and Low Helmholtz Numbers," Journal of Fluid Mechanics, vol. 256, pp. 499-534, (1993) (36 pages).
Benoit Chushman-Roisin, "Chapter 9, Turbulent Jets," Environmental Fluid Mechanics, Dartmouth College, Thayer School of Engineering, pp. 153-161, (Mar. 2014) (9 pages).
Beatove, Santiago Lain, "Dispersion de Particulars Solidas en Flujos Bifasicos Turbulentos de Interes Industrial," Ingenieria y Desarrollo: Revista de la Division de Ingenieria de la Universidad del Norte, ISSN 0122-3461, No. 17, pp. 87-114 (2005) (28 pages).
Brennen, Christopher Earls, "Cavitation and Bubble Dynamics," California Institute of Technology, Oxford University Press, New York, ISBN 0-19-509409-3 (1995) (254 pages).
University of New South Wales, Australia, "Acoustic Compliance, Inertance and Impedance," retrieved from http://www.animations.physics.unsw.edu.au/jw/compliance-inertance-impedance.htm on Mar. 8, 2013. (4 pages).

* cited by examiner

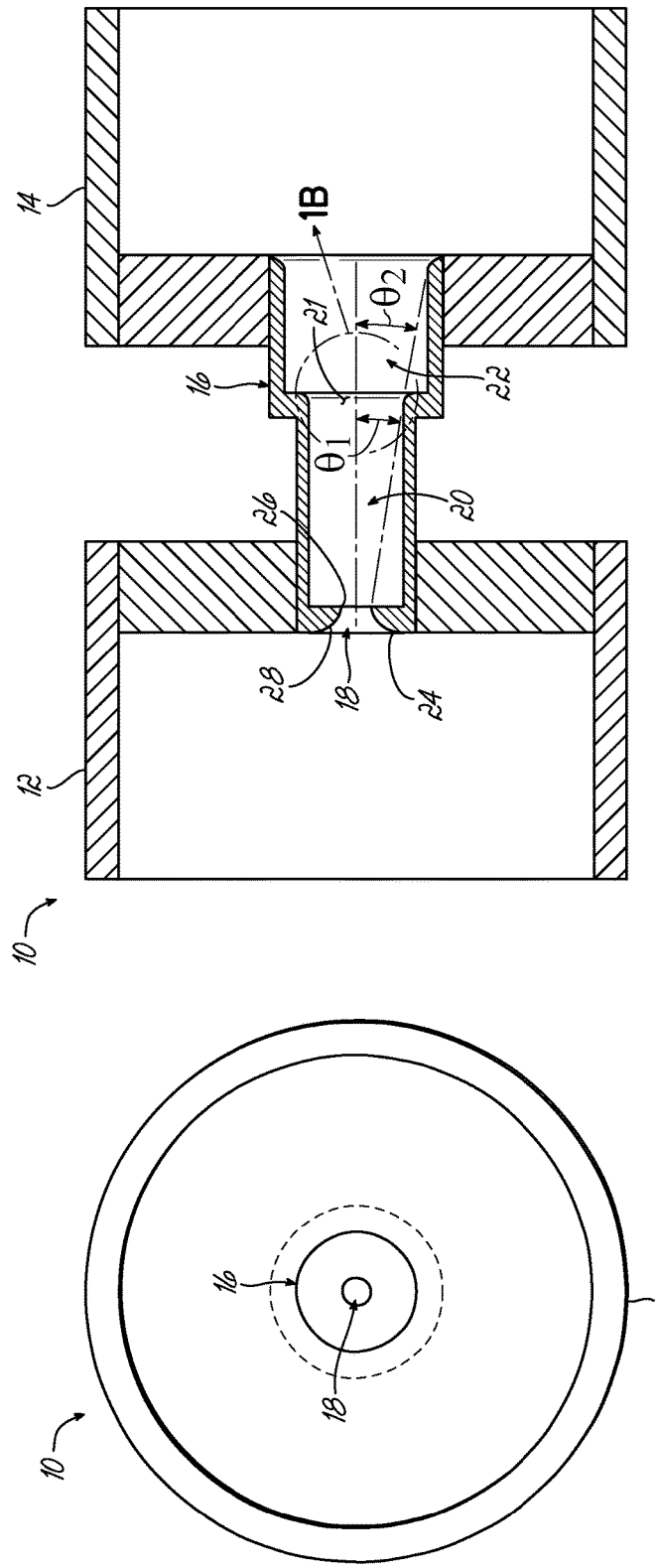
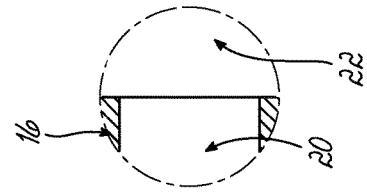
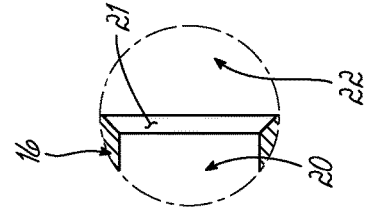
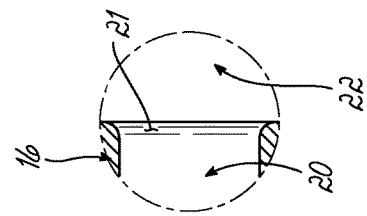

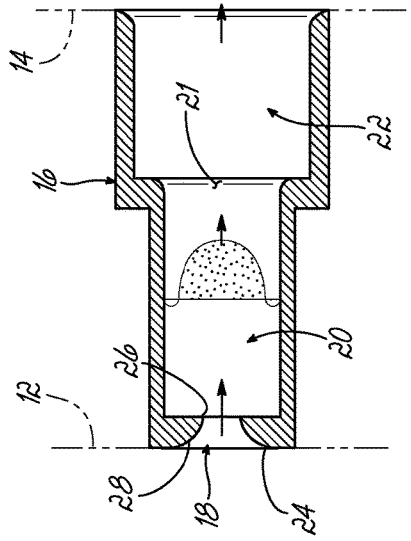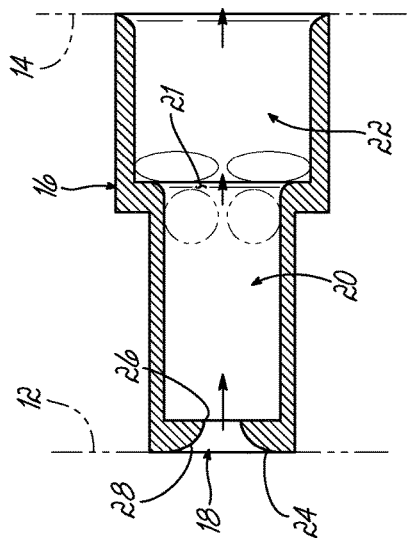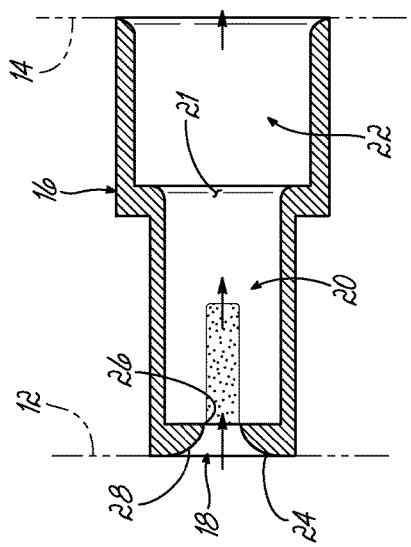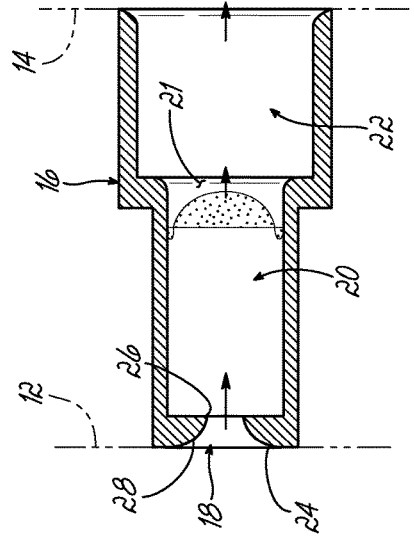

LIQUID TREATMENT APPARATUS WITH RING VORTEX PROCESSOR AND METHOD OF USING SAME

CROSS-REFERENCE TO RELATED APPLICATION

This application claims the benefit of the earlier filing date of U.S. Provisional Application No. 62/089,033, filed Dec. 8, 2014, which is hereby incorporated by reference in its entirety.

TECHNICAL FIELD

The invention relates to a liquid treatment apparatus for treating a liquid medium and, more particularly, to an apparatus and method for enhancing chemical reactions occurring in processes utilizing hydrodynamic cavitation.

BACKGROUND

Cavitation is the formation and implosion or collapse of cavities, or bubbles, in a liquid that are the consequence of forces acting upon the liquid. Cavitation usually occurs when the local pressure within a liquid is reduced to less than the vapor pressure of the liquid.

Many industrial processes rely on various chemical reactions in a liquid medium to achieve a certain end product or result. Accordingly, manufacturers and others that perform these industrial processes continually seek improvements to these processes so as to improve their efficiency and provide a cost benefit. By way of example, increasing the efficiency in chemical reactions occurring in a liquid medium may result in a decrease in processing time, which may lead to an increase in overall production and decrease in operating costs, and/or a decrease in chemical consumption in the liquid medium for achieving the desired result, which may in turn reduce operating costs. These are only exemplary and, depending on the specific application, many other benefits may be gained by improving the efficiency of various chemical reactions.

There are numerous industrial applications that may benefit from improved chemical reactions using cavitation. For example, the use of cavitation in the treatment of contaminated water, e.g., wastewater, is documented. In these cavitation methods, the goal is to generate many fine bubbles, which upon their implosion create intense, but highly localized temperatures and pressures. This energy release then causes dissolution of the water molecules and the creation of free hydroxyl radicals. The potential of these powerful radicals for the beneficial treatment of the water has been well recognized for many years. However, the inefficiencies in the known processes for generating cavitation within a liquid (e.g., ultrasonic, spinning impeller, or jet cavitation) have limited commercial acceptance in the industrial marketplace.

It should be noted that in cavitation, the process of generating bubbles is often considered secondary in importance to the subsequent process of collapsing the bubbles, since it is the collapse which produces the effecting high temperatures and pressures. More intense bubble collapse results in higher temperatures and allows more energetic bonds to be broken at the molecular level. This increases the ability of the cavitation process to destroy microorganisms and separate particulate matter, such as breaking bonds between or within molecules. Maximum bubble collapse temperatures and pressures are achieved by maximizing bubble collapse velocities.

Preferably, in order to maximize effectiveness, bubbles should collapse in rapid succession in a process referred to as cavitation cloud collapse, thereby generating high amplitude/frequency pressure waves which can be used to produce high pressure differentials around and across the bubbles. Cavitation cloud collapse can generate pressures that are orders of magnitude higher than those produced by single bubble collapse. However, the proper synchronization for cavitation cloud collapse is difficult to achieve. When an individual bubble collapses under uniform ambient pressure, the collapse rate is restrained due to the inertia of the surrounding fluid. Following collapse, a pressure wave is generated which radiates energy spherically outward from its center. The amplitude of the pressure wave is reduced as a function of the square of the distance from the center of the bubble collapse, such that the amplitude decreases relatively rapidly. If several bubbles collapse in a random manner, pressure waves generated from these collapses impact upon other bubbles in a random manner. The amplitudes of the resulting pressure waves will also vary in a random manner. Due to the random nature of these pressure waves, cavitation cloud collapse will not be initiated, and maximum bubble collapse temperatures and pressures will not be achieved. However, if a uniform, coherent, high frequency pressure wave encounters a cloud of bubbles, then the increase in differential pressure applied to the bubbles will tend to cause the bubbles to collapse in the direction of the pressure wave, such that the energy from the bubble collapses will be added to the original pressure wave, increasing its amplitude. This will tend to increase the amplitude of the individual pressure pulses generated by successive bubble collapses, and will also tend to increase the frequency of these pressure pulses.

When uncontrolled, hydrodynamic cavitation can be very damaging. Studies have shown that cloud collapse is more violent than collapse of individual bubbles. Typically, the damage is most severe on solid surfaces close to the location of the cloud collapse. Shock waves formed by clouds of cavitation bubbles that implode on or near a metal surface can cause cyclic stress through repeated implosion, resulting in surface fatigue and erosion of the metal. As a result, leaks can eventually form in the walls of a device in which cloud cavitation occurs. Therefore, the implosion of cavitation bubble clouds must be controlled in order to effectively utilize their energy while minimizing or eliminating damage to the surrounding walls.

A wide variety of cavitation generators exist in the prior art. For example, U.S. Pat. No. 4,474,251 to Virgil E. Johnson, Jr. describes an acoustic-hydrodynamic resonator which may utilize an organ-pipe oscillator in conjunction with a Helmholtz resonator chamber to produce a pulsed liquid jet for eroding a solid surface. In one embodiment, liquid is directed through a first orifice and a jet is formed by directing the liquid through a second orifice, and the jet is pulsed by oscillating the pressure of the liquid after it exits the first orifice through hydrodynamic and acoustic interactions. Typically, a Helmholtz chamber is formed between the first and second orifices, wherein the pressure of the liquid is oscillated within the Helmholtz chamber, and a portion of the energy of the high velocity liquid is utilized to pulse the liquid. The cavitation bubble collapse occurs within the discharge stream and not within the device. The device in the '251 patent may be termed a pure fluid device since it is entirely passive and requires no outside energy supply. The energy for its operation comes only from the fluid and it depends on hydrodynamic and acoustic interactions for its operation. In addition, several hydrodynamic cavitation generators have been provided by Oleg V. Kozyuk and others. However, none of these devices adequately generate cavitation bubble cloud collapse, and in particular, none of these devices capture and utilize residual pressure wave energy to enhance formation and collapse of subsequent cavitation bubble clouds.

Accordingly, it would be beneficial to provide a cavitation generator that efficiently utilizes fluid energy for cavitation bubble formation and that maximizes the temperatures and pressures generated during bubble collapse, and that also minimizes damage caused by erosion.

SUMMARY OF THE INVENTION

The present invention provides for a liquid treatment apparatus with ring vortex processor that efficiently utilizes fluid energy for cavitation bubble formation and that maximizes the temperatures and pressures generated during bubble collapse, and that also minimizes damage caused by erosion.

In one embodiment of the invention, a liquid treatment apparatus is provided that includes a supply chamber for receiving a fluid, a discharge chamber for discharging the fluid, and a ring vortex processor extending from a position on the supply chamber to a position on the discharge chamber for providing a fluid flow path therebetween, wherein the ring vortex processor is operable to generate and collapse cavitation bubbles. The ring vortex processor includes an inlet nozzle and a nozzle discharge, with the inlet nozzle positioned downstream of the supply chamber and having a cross dimension that is less than a cross dimension of the supply chamber for providing a fluid constriction. The ring vortex processor further includes a vortex formation chamber and an expansion portion positioned downstream of the vortex formation chamber, with the vortex formation chamber positioned downstream of the inlet nozzle, adjacent the nozzle discharge, and having a cross dimension that is greater than a cross dimension of the nozzle discharge.

In another embodiment of the invention, a liquid treatment apparatus is provided that includes a supply chamber for receiving a fluid, a discharge chamber for discharging the fluid, and a ring vortex processor extending from a position on the supply chamber to a position on the discharge chamber for providing a fluid flow path therebetween, wherein the ring vortex processor is operable to generate and collapse cavitation bubbles. The ring vortex processor includes an inlet nozzle and a nozzle discharge positioned downstream of the supply chamber, with the inlet nozzle having a cross dimension that is less than a cross dimension of said supply chamber for providing a fluid constriction. The ring vortex processor further includes a vortex formation chamber positioned downstream of the inlet nozzle, adjacent the nozzle discharge, and having a cross dimension that is greater than a cross dimension of the nozzle discharge. The ring vortex processor also includes a vortex collapse chamber positioned downstream of the vortex formation chamber and having a cross dimension that is greater than a cross dimension of the vortex formation chamber.

In another embodiment of the invention, a method of treating a liquid is provided that includes directing a fluid from a supply chamber into a vortex formation chamber by constricting the fluid through an inlet nozzle, wherein the inlet nozzle has a cross dimension that is less than a cross dimension of the supply chamber, such that a fluid jet is formed, and wherein the vortex formation chamber has a cross dimension that is greater than a cross dimension of the inlet nozzle. The method further includes allowing the fluid jet to expand downstream of the inlet nozzle such that the fluid jet may contact an interior of the vortex formation chamber and discharging the fluid from the vortex formation chamber via a rounded expansion portion.

The features and objectives of the present invention will become more readily apparent from the following Detailed Description taken in conjunction with the accompanying drawings.

BRIEF DESCRIPTION OF THE DRAWINGS

Embodiments of the invention will now be further described with reference to the drawings, in which:

FIG. 1 is a longitudinal cross sectional view of an exemplary liquid treatment apparatus in accordance with an embodiment of the present invention;

FIG. 1A is an end view of the exemplary liquid treatment apparatus of FIG. 1;

FIG. 1B is an enlarged view of the expansion portion shown in FIG. 1;

FIG. 1C is an enlarged view of an alternative expansion portion;

FIG. 1D is an enlarged view of another alternative expansion portion;

FIG. 2 is a longitudinal cross sectional view of the ring vortex processor shown in FIG. 1, further depicting illustrative representations of a fluid velocity profile;

FIG. 3 is a longitudinal cross sectional view similar to FIG. 2, depicting the fluid velocity profile at a later moment in time;

FIG. 4 is a longitudinal cross sectional view similar to FIGS. 2 and 3, depicting the fluid velocity profile at a later moment in time; and FIG. 5 is a longitudinal cross sectional view of the ring vortex processor shown in FIG. 1, further depicting illustrative representations of a ring vortex.

DETAILED DESCRIPTION

Referring now to FIG. 1, a liquid treatment apparatus 10 includes a supply chamber 12, a discharge chamber 14, and a ring vortex processor 16 extending therebetween. The supply chamber 12 may have a substantially cylindrical configuration with a length and a constant cross dimension or diameter, and may be configured to receive a fluid supply, such as, for example, an untreated or partially contaminated fluid supply.

The ring vortex processor 16 is positioned downstream of the supply chamber 12, and may include an inlet nozzle 18, a vortex generating or formation chamber 20, and an expansion portion 21. In one embodiment, the ring vortex processor 16 may further include a vortex collapse chamber 22. In other embodiments, however, the vortex collapse chamber 22 may be omitted and the end of the formation chamber 20 may be adjacent the discharge chamber 14.

The inlet nozzle 18 may include an inlet nozzle entrance 24, an inlet nozzle discharge 26 adjacent the vortex formation chamber, and a smoothly rounded or arcuate portion 28 between the nozzle entrance 24 and discharge 26. The inlet nozzle 18 may be configured to generate a high velocity fluid jet with a "top hat" exit velocity profile (nearly uniform velocity across most of the channel transitioning rapidly to nearly zero velocity around the perimeter), as shown in FIG. 2, while maintaining laminar flow with minimal turbulence such that there may be few eddies within the fluid jet that may promote the formation of cavitation bubbles within the nozzle. Moreover, such a velocity profile results in the velocity of the periphery of the jet at the nozzle discharge 26 to be low, which may also minimize the formation of cavitation bubbles around the perimeter of the jet in close proximity to the nozzle 18. Therefore, the risk of nozzle erosion due to cavitation bubble collapse within the inlet nozzle 18 may be reduced.

The diameter of the nozzle entrance 24 may be substantially greater than the diameter of the nozzle discharge 26. In one embodiment, for example, the cross dimension of the nozzle entrance 24 may be at least approximately 2.25 times the cross dimension of the inlet nozzle discharge 26. By way of further example, the cross dimension of the nozzle entrance 24 may be between about 7 millimeters and about 225 millimeters for many fluid applications, including, for example, water, such that the cross dimension of the nozzle discharge 26 may be between about 3 millimeters and about 100 millimeters. These ranges are merely exemplary and may vary depending on several factors, including the particular fluid. For example, in one embodiment utilizing water at ambient temperatures, the cross dimension of the nozzle entrance 24 may be about 36 millimeters, such that the cross dimension of the nozzle discharge 26 may be about 16 millimeters. However, as noted above, it will be appreciated that the cross dimensions of the nozzle entrance and discharge 24, 26 may vary for different fluid applications.

In an alternative embodiment, an inlet nozzle may include an inlet nozzle entrance, an inlet nozzle discharge, and a conical (tapered) section therebetween (not shown). However, such an arrangement may be less effective, and may generate more turbulence within the inlet nozzle, resulting in a greater degree of cavitation induced erosion. In yet another alternative embodiment, an orifice plate type inlet could be utilized, but may also be less effective and may also experience a greater degree of cavitation induced erosion within the inlet nozzle.

In one embodiment, the radius of the smoothly rounded portion 28 of the inlet nozzle 18 may be at least 0.625 times the diameter of the nozzle discharge 26. This size ratio may minimize energy loss within the inlet nozzle 18 resulting in low levels of turbulence and minimal disruption of the boundary layer (the layer of fluid near the boundary surface experiencing high shear stresses) so as to maximize laminar boundary layer thickness. It will be appreciated that a thick laminar boundary layer may help promote ring vortex formation while minimizing cavitation bubble formation within the nozzle 18. Preferably, the radius of the smoothly rounded portion 28 may be between about 1.5 millimeters and about 100 millimeters for many fluid applications, including, for example, water. It should be appreciated that this range may vary depending on several factors, including the particular fluid. For example, in one embodiment utilizing water at ambient temperatures, the radius of the smoothly rounded portion 28 may be about 12 millimeters. However, as noted above, it will be appreciated that the radius of the smoothly rounded portion 28 may vary for different fluid applications.

The inlet nozzle discharge 26 may include a substantially sharp edge and may be at or approaching 90 degrees to the axis of fluid flow, in order to facilitate maximum pressure wave energy reflection within the vortex formation chamber 20 (more fully described below). It will be appreciated that maximizing pressure wave energy reflection within the vortex formation chamber 20 minimizes pressure wave energy losses due to the pressure wave passing through the inlet nozzle 18 to the upstream fluid, and also minimizes erosive damage to the inlet nozzle 18 that may otherwise be caused by cavitation within the inlet nozzle 18. This configuration may also serve to help facilitate the formation of ring vortices within the vortex formation chamber 20.

The vortex formation chamber 20 may have a substantially cylindrical configuration with a length and a constant cross dimension or diameter, and may be operable to generate ring vortices. The cross dimension of the vortex formation chamber 20 may be substantially greater than the cross dimension of the inlet nozzle discharge 26. In one embodiment, the diameter of the vortex formation chamber 20 and the diameter of the nozzle discharge 26 may be interrelated by a specific ratio, which may be calculated for each application based upon a number of parameters including, for example, supply pressure, fluid density, fluid vapor pressure and discharge pressure. For example, the ratio of the cross sectional area of the vortex formation chamber 20 relative to the cross sectional area of the inlet nozzle discharge 26 may be:

$$\frac{A_{VFC}}{A_{IND}} = \frac{2 \times \psi_{IND}}{P_{O,abs} - P_{vap,abs}}$$

Where:
$A_{VFC}$=the cross sectional area of the vortex formation chamber
$A_{IND}$=the cross sectional area of the inlet nozzle discharge
$\psi_{IND}$=the absolute net inlet head at the inlet nozzle discharge
$P_{O,abs}$=the absolute outlet pressure at the ring vortex processor discharge (i.e., the end of the collapse chamber 22 adjacent the discharge chamber 14)
$P_{vap,abs}$=the absolute vapor pressure of the process fluid.

It should be appreciated that a smaller area ratio may result in continuous cavitation, which may prevent formation of ring vortices, cavitation bubble cloud collapse, and the associated water hammer pressure pulse. Moreover, a substantially greater area ratio may result in a reduction in the amplitude of the water hammer pressure pulse, which may result in reduced pressures and temperatures generated upon cavitation bubble collapse. Preferably, the cross dimension of the vortex formation chamber 20 may be between about 10 millimeters and about 500 millimeters for many fluid applications. However, it should be appreciated that this range may vary depending on several factors, including the particular fluid. For applications utilizing water at ambient temperatures, the cross dimension of the vortex formation chamber 20 may be between about 10 millimeters and about 450 millimeters. For example, in one embodiment utilizing water at ambient temperatures, the cross dimension of the vortex formation chamber 20 may be about 50 millimeters. However, as noted above, it will be appreciated that the cross dimension of the vortex formation chamber 20 may vary for different fluid applications.

In an exemplary embodiment, the length of the vortex formation chamber 20 may be such that a (hypothetical) fluid jet expanding at the "free" jet angle of expansion (approximately 11.8 degrees per side) will contact the internal wall of the vortex formation chamber 20 at or near the end of the vortex formation chamber 20 adjacent the expansion portion 21. As such, recirculation flow of the fluid may temporarily accelerate due to the reduced flow area available between the jet and the internal wall, as illustrated in FIGS. 3 and 4. The high recirculation velocity may facilitate the formation of ring vortices in the fluid stream. Specifically, the "top hat" flow profile of the jet flowing from the inlet nozzle discharge 26 may be converted to ring vortices, as schematically illustrated in FIG. 5 in phantom adjacent the end of the formation chamber 20. As the jet flows through the vortex formation chamber 20, additional fluid is entrained within the jet, increasing the diameter and reducing mean velocity. Counter-current flow adjacent the walls of the formation chamber 20 occurs to supply this additional fluid. Under such fluctuating flow conditions, ring vortices may be formed. Moreover, the vortices may become larger as more fluid is entrained in the fluid stream.

Since the rotational velocity, diameter, and core pressure of each ring vortex may be varied by changing operating and design parameters, the vortex core pressure may be lowered sufficiently to form a cloud of cavitation bubbles. Moreover, as the recirculation flow accelerates, the pressure differential between the vortex formation and collapse chambers 20, 22 may increase, such that the pressure in the formation chamber 20 may decrease. It will be appreciated that a decrease in pressure in the vortex formation chamber 20 may cause additional bubbles to form within the vortices. Notably, as the cavitation bubbles are formed, the effective volume of the fluid increases.

Therefore, an optimum length of the vortex formation chamber 20 may be selected based upon the diameter of the inlet nozzle discharge 26 and the diameter of the vortex formation chamber 20. It should be appreciated, however, that some degree of tuning may be required due to variations in working fluid viscosity or other factors. In one embodiment, the length of the vortex formation chamber 20 may be selected such that the angle $\theta_1$ between the axis of flow (or longitudinal axis of the vortex formation chamber 20) and a line drawn from the edge of the inlet nozzle discharge 26 to a point tangential to the radius of the expansion portion 21 may be between approximately 8 and 12 degrees, and preferably approximately 10 degrees. It should be appreciated that angles within this range approaching 12 degrees may result in ring vortex formation, but may result in reduced cavitation bubble cloud volume. Moreover, angles within this range approaching 8 degrees may also result in ring vortex formation, but may be less effective. Angles smaller than 8 degrees may be utilized, particularly with lower viscosity fluids, but may be even less effective in forming ring vortices. Preferably, the length of the vortex formation chamber 20 may be between about 14.5 millimeters and about 1400 millimeters for many fluid applications. However, it should be appreciated that this range may vary depending on several factors, including the particular fluid. For applications utilizing water at ambient temperatures, the length of the vortex formation chamber 20 may be between about 14.5 millimeters and about 1150 millimeters. For example, in one embodiment utilizing water at ambient temperatures, the length of the vortex formation chamber 20 may be about 100 millimeters. However, as noted above, it will be appreciated that the length of the vortex formation chamber 20 may vary for different fluid applications.

The vortex collapse chamber 22 may have a substantially cylindrical configuration with a constant cross dimension or diameter, and may be operable to induce cavitation bubble cloud collapse within the ring vortices. For example, the cross dimension of the vortex collapse chamber 22 may be substantially greater than the cross dimension of the vortex formation chamber 20. In one embodiment, the cross sectional area of the vortex collapse chamber 22 may substantially equal approximately two times the cross sectional area of the vortex formation chamber 20, or the cross dimension of the vortex collapse chamber 22 may be substantially equal to approximately 1.5 times the cross dimension of the vortex formation chamber 20. It should be appreciated that a substantially smaller ratio may result in insufficient vortex diameter expansion, which may subsequently result in incomplete cavitation bubble collapse. Moreover, a substantially larger ratio may result in reduced water hammer pressure wave amplitude, which may subsequently result in reduced performance. Preferably, the cross dimension of the vortex collapse chamber 22 may be between about 15 millimeters and about 1,000 millimeters for many fluid applications. However, it will be appreciated that this range may vary depending on several factors, including the particular fluid. For applications utilizing water at ambient temperatures, the cross dimension of the vortex collapse chamber 22 may be between about 15 millimeters and about 675 millimeters. For example, in one embodiment utilizing water at ambient temperatures, the cross dimension of the vortex collapse chamber 22 may be about 76 millimeters. However, as noted above, it will be appreciated that the cross dimension of the vortex collapse chamber 22 may vary for different fluid applications.

A smoothly rounded expansion portion 21 may be provided between the vortex formation and vortex collapse chambers 20, 22, in order to provide a gradual increase in diameter, as shown in FIG. 1B. In one embodiment, the expansion portion 21 may be configured with a radius substantially equal to the radius of smoothly rounded portion 28 of the inlet nozzle 18. Preferably, the radius of the expansion portion 21 may be between about 0 millimeters and about 25 millimeters for many fluid applications, including, for example, water. However, it will be appreciated that this range may vary depending on several factors, including the particular fluid. For example, in one embodiment utilizing water at ambient temperatures, the radius of the expansion portion 21 may be about 12 millimeters. However, as noted above, it will be appreciated that the radius of the expansion portion 21 may vary for different fluid applications.

In another embodiment, a tapered expansion portion 21a may be provided between the vortex formation and collapse chambers 20, 22 (FIG. 1C). Alternatively, the vortex formation and collapse chambers 20, 22 may be adjacent each other, such that no expansion portion is provided (FIG. 1D). For example, the vortex formation chamber 20 may include a discharge having a sharp edge, similar to the inlet nozzle discharge 26.

In operation, as a ring vortex (formed in vortex formation chamber 20) enters the vortex collapse chamber 22 via the expansion portion 21, the sudden expansion may allow the major diameter of the ring vortex to increase in a direction perpendicular to the axis of flow. This increase in the major diameter may cause the circulation flow within the vortex to follow a substantially elliptical path, rather than the former more circular path. As such, the ring vortex may be said to "flatten" in an axial direction, as illustrated in FIG. 5. This may reduce centrifugal force, which results in an increase in pressure within the vortices. As a result, the bubble cloud within the vortex may begin to collapse, generating high localized temperatures and pressures, as previously described. Moreover, the collapse may result in a sudden reduction in fluid volume, thereby causing a sudden reduction in downstream flow velocity which may generate water hammer pressure waves. These water hammer pressure waves may travel away from the bubble collapse in both upstream and downstream directions. While the amplitudes of these water hammer pressure waves may depend upon the mean flow velocity of fluid within the vortex formation and collapse chambers 20, 22, it is understood that the amplitudes may exceed 10 bar if using a smoothly rounded expansion portion 21.

It is believed that the generated water hammer pressure waves may assist in collapsing nearby bubbles within the cloud as the waves travel away from the original bubble collapse, resulting in a substantially uniform collapse of the bubble cloud. Moreover, the pressure wave energy may be utilized in forming and collapsing additional cavitation bubbles throughout the ring vortex processor 16. In this regard, a low pressure phase of the water hammer pressure wave travelling upstream from the original bubble collapse may form additional cavitation bubbles within the vortex formation chamber 20. Subsequently, a pressure spike in the form of a high pressure phase of the water hammer pressure wave may rapidly collapse the additional cavitation bubbles, such that substantially no un-collapsed cavitation bubbles may remain within the processor 16.

In one embodiment, the vortex collapse chamber 22 and inlet nozzle 18 may be configured to provide boundaries which "trap" the pressure wave energy within the ring vortex processor 16 in order to minimize the number of un-collapsed cavitation bubbles exiting the processor 16. By providing reflection of the pressure wave energy near the entrance and exit of the ring vortex processor 16, water hammer pressure waves may pass through the vortex formation and collapse chambers 20, 22 during the low pressure phase, such that cavitation bubbles may be formed. As the pressure wave energy reflects at or near the entrance and exit of the processor 16, even more cavitation bubbles may be formed therein. Subsequently, during the high pressure phase, the cavitation bubbles may be rapidly collapsed by the high frequency, high amplitude pressure pulse. The high pressure phase wave energy may be substantially entirely exhausted in the collapse of the cavitation bubbles, such that the pressure wave energy may dissipate prior to reaching the entrance and exit of the processor 16.

Notably, in the absence of the vortex collapse chamber 22, a large fraction of the pressure wave energy resulting from the collapse of cavitation bubbles would be radiated in the form of a lower amplitude pressure wave, which would be much less effective at generating and collapsing additional cavitation bubbles.

In order to achieve reflection of pressure waves near the entrance and exit of the ring vortex processor 16, the diameter of the inlet nozzle discharge 26 may be substantially less than the diameter of the vortex formation chamber 20, and the diameter of the vortex collapse chamber 22 may be substantially less than the diameter of the discharge chamber 14. It will be appreciated that the fraction of the pressure wave energy exiting the vortex collapse chamber 22 into the discharge chamber 14 may be approximately inversely proportional to the ratio of the cross sectional area of the discharge chamber 14 relative to the cross sectional area of the vortex collapse chamber 22. Similarly, the fraction of the pressure wave energy exiting the vortex formation chamber 20 into the inlet nozzle 18 may be approximately inversely proportional to the ratio of the cross sectional area of the vortex formation chamber 20 relative to the cross sectional area of the inlet nozzle discharge 26. For example, in one embodiment, the diameter of the discharge chamber 14 may be approximately two times the diameter of the vortex collapse chamber 22, such that the fraction of the pressure wave energy passing into the discharge chamber 14 may equal about $1^2/2^2$, or about $\frac{1}{4}$, of the total pressure wave energy. In other words, about ¾ or 75% of the pressure wave energy would be reflected at or near the exit of the ring vortex processor 16. In another embodiment, the diameter of the vortex formation chamber 20 may be approximately 3 times the diameter of the inlet nozzle discharge 26, such that the fraction of the pressure wave energy passing into the inlet nozzle 18 may equal about $1^2/3^2$, or about $\frac{1}{9}$, of the total pressure wave energy. In other words, about 89% of the pressure wave energy would be reflected at or near the entrance of the ring vortex processor 16.

The length of the vortex collapse chamber 22 may be selected as a function of the diameter of the vortex formation chamber 20 and the diameter of the vortex collapse chamber 22. In one embodiment, the length of the vortex collapse chamber 22 may be selected in a manner similar to that previously described with respect to the length of the vortex formation chamber 20, such that the angle $\theta_2$ between the axis of flow (or longitudinal axis of the vortex collapse chamber 22) and a line drawn from a point tangential to the radius of the expansion portion 21 to an edge of the vortex collapse chamber 22 that is adjacent the discharge chamber 14 may be between approximately 8 and 12 degrees, and preferably approximately 10 degrees. Some tuning may be required due to variations in working fluid viscosity or other factors. Alternatively, the length of the vortex collapse chamber 22 may be adjusted such that the resonant frequency within the vortex collapse chamber 22 may be substantially equal to the resonant frequency within the vortex formation chamber 20. Preferably, the length of the vortex collapse chamber 22 may be between about 11 millimeters and about 2,650 millimeters for many fluid applications. However, it will be appreciated that this range may vary depending on several factors, including the particular fluid. For applications utilizing water at ambient temperatures, the length of the vortex collapse chamber 22 may be between about 11 millimeters and about 1,500 millimeters. For example, in one embodiment utilizing water at ambient temperatures, the length of the vortex collapse chamber 22 may be about 90 millimeters. However, as noted above, it will be appreciated that the length of the vortex collapse chamber 22 may vary for different fluid applications.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in numerous combinations depending on the needs and preferences of the user. There may be many variations of the design parameters which may be preferred, and the combination to be used will depend on preferences of the end user (e.g. pump performance parameters). Thus, alternative design parameters and methods of selecting design parameters may be used without departing from the spirit and scope of the present invention.

What is claimed is:

1. A liquid treatment apparatus, comprising:
 a supply chamber for receiving a fluid;
 a discharge chamber for discharging the fluid; and
 a ring vortex processor extending from a position on said supply chamber to a position on said discharge chamber for providing a fluid flow path therebetween, wherein said ring vortex processor is operable to generate and collapse cavitation bubbles, said ring vortex processor comprising:
 an inlet nozzle positioned downstream of said supply chamber, said inlet nozzle having a cross dimension that is less than a cross dimension of said supply chamber for providing a fluid constriction, and including a nozzle discharge;
a vortex formation chamber positioned downstream of said inlet nozzle and adjacent said nozzle discharge, said vortex formation chamber having a cross dimension that is greater than a cross dimension of said nozzle discharge; and
an expansion portion positioned downstream of said vortex formation chamber,
wherein a length of said vortex formation chamber is selected such that a first angle between a longitudinal axis of said vortex formation chamber and a line from an edge of said nozzle discharge to a point tangential said expansion portion is between approximately 8 and 12 degrees.

2. The liquid treatment apparatus of claim 1, wherein said ring vortex processor further comprises a vortex collapse chamber positioned downstream of said expansion portion, said vortex collapse chamber having a cross dimension that is greater than a cross dimension of said vortex formation chamber.

3. The liquid treatment apparatus of claim 1, wherein the cross dimension of said vortex formation chamber is between about 10 millimeters and about 500 millimeters.

4. The liquid treatment apparatus of claim 1, wherein said inlet nozzle includes a rounded inlet portion.

5. The liquid treatment apparatus of claim 1, wherein said nozzle discharge includes a sharp edge adjacent said vortex formation chamber.

6. The liquid treatment apparatus of claim 1, wherein said inlet nozzle further includes a nozzle entrance, and wherein a cross dimension of said nozzle entrance is greater than a cross dimension of said nozzle discharge.

7. The liquid treatment apparatus of claim 1, wherein said inlet nozzle further includes a nozzle entrance, and wherein a cross dimension of said nozzle entrance is at least approximately 2.25 times a cross dimension of said nozzle discharge.

8. The liquid treatment apparatus of claim 1, wherein said inlet nozzle further includes a nozzle entrance, and wherein a cross dimension of said nozzle entrance is between about 7 millimeters and about 225 millimeters.

9. The liquid treatment apparatus of claim 1, wherein a cross dimension of said nozzle discharge is between about 3 millimeters and about 100 millimeters.

10. The liquid treatment apparatus of claim 1, wherein the first angle is approximately 10 degrees.

11. The liquid treatment apparatus of claim 1, wherein a length of said vortex formation chamber is between about 14.5 millimeters and about 1400 millimeters.

12. The liquid treatment apparatus of claim 4, wherein a radius of said rounded inlet portion is at least approximately 0.625 times a cross dimension of said nozzle discharge.

13. The liquid treatment apparatus of claim 4, wherein a radius of said rounded inlet portion is between about 3 millimeters and about 100 millimeters.

14. The liquid treatment apparatus of claim 2, wherein the cross sectional area of said vortex collapse chamber is equal to approximately two times the cross sectional area of said vortex formation chamber.

15. The liquid treatment apparatus of claim 2, wherein a cross dimension of said vortex collapse chamber is between about 15 millimeters and about 1,000 millimeters.

16. The liquid treatment apparatus of claim 4, wherein said expansion portion includes a radius that is equal to a radius of said rounded inlet portion.

17. The liquid treatment apparatus of claim 1, wherein said expansion portion includes a radius that is between about 0 millimeters and about 25 millimeters.

18. The liquid treatment apparatus of claim 2, wherein a cross dimension of said vortex collapse chamber is less than a cross dimension of said discharge chamber.

19. The liquid treatment apparatus of claim 2, wherein a length of said vortex collapse chamber is selected such that a second angle between a longitudinal axis of said vortex collapse chamber and a line from a point tangential said expansion portion to an edge of said vortex collapse chamber adjacent said discharge chamber may be between approximately 8 and 12 degrees.

20. The liquid treatment apparatus of claim 19, wherein the second angle is approximately 10 degrees.

21. The liquid treatment apparatus of claim 2, wherein a length of said vortex collapse chamber is between about 11 millimeters and about 2,650 millimeters.

22. The liquid treatment apparatus of claim 2, wherein a length of said vortex collapse chamber is selected such that a resonant frequency within said vortex collapse chamber is equal to a resonant frequency within said vortex formation chamber.

23. The liquid treatment apparatus of claim 1, wherein the ratio of the cross sectional area of said vortex formation chamber relative to the cross sectional area of said inlet nozzle discharge is represented by the following formula:

$$\frac{A_{VFC}}{A_{IND}} = \frac{2 \times \psi_{IND}}{P_{O,abs} - P_{vap,abs}}$$

Where:
$A_{VFC}$=the cross sectional area of said vortex formation chamber;
$A_{IND}$=the cross sectional area of said inlet nozzle discharge;
$\psi_{IND}$=the absolute net inlet head at said inlet nozzle discharge;
$P_{O,abs}$=the absolute outlet pressure at a discharge of said ring vortex processor; and
$P_{vap,abs}$=the absolute vapor pressure of the process fluid.

24. A liquid treatment apparatus, comprising:
a supply chamber for receiving a fluid;
a discharge chamber for discharging the fluid; and
a ring vortex processor extending from a position on said supply chamber to a position on said discharge chamber for providing a fluid flow path therebetween, wherein said ring vortex processor is operable to generate and collapse cavitation bubbles, said ring vortex processor comprising:
an inlet nozzle positioned downstream of said supply chamber, said inlet nozzle having a cross dimension that is less than a cross dimension of said supply chamber for providing a fluid constriction, and including a nozzle discharge;
a vortex formation chamber positioned downstream of said inlet nozzle and adjacent said nozzle discharge, said vortex formation chamber having a cross dimension that is greater than a cross dimension of said nozzle discharge; and
a vortex collapse chamber positioned downstream of said vortex formation chamber, said vortex collapse chamber having a cross dimension that is greater than a cross dimension of said vortex formation chamber, wherein a length of said vortex formation chamber is selected such that a first angle between a longitudinal axis of said vortex formation chamber and a line from an edge of said nozzle discharge to a point tangential said expansion portion is between approximately 8 and 12 degrees, and wherein a length of said vortex collapse chamber is selected such that a second angle between a longitudinal axis of said vortex collapse chamber and a line from a point tangential said expansion portion to an edge of said vortex collapse chamber adjacent said discharge chamber is between approximately 8 and 12 degrees.

* * * * *